US009931835B2

(12) United States Patent
Valade et al.

(10) Patent No.: US 9,931,835 B2
(45) Date of Patent: Apr. 3, 2018

(54) PRINT HEAD FRICTION DETECTION SYSTEM

(71) Applicant: Océ Holding B.V., Venlo (NL)

(72) Inventors: Cédric T. Valade, Villiers sur Marne (FR); Riadh Fezzani, Montrouge (FR)

(73) Assignee: OCÉ HOLDINGS B.V., Venlo (NL)

( * ) Notice: Subject to any disclaimer, the term of this patent is extended or adjusted under 35 U.S.C. 154(b) by 0 days.

(21) Appl. No.: 15/443,833

(22) Filed: Feb. 27, 2017

(65) Prior Publication Data
US 2017/0259559 A1 Sep. 14, 2017

(30) Foreign Application Priority Data

Mar. 8, 2016 (EP) ..................................... 16159063

(51) Int. Cl.
*B41J 2/045* (2006.01)
*B41J 25/00* (2006.01)

(52) U.S. Cl.
CPC ....... *B41J 2/04508* (2013.01); *B41J 2/04586* (2013.01); *B41J 25/001* (2013.01)

(58) Field of Classification Search
CPC .. B41J 2/04508; B41J 2/04586; B41J 25/001; B41J 29/38; B41J 29/393; B41J 11/006
USPC ......................................................... 347/19
See application file for complete search history.

(56) References Cited

U.S. PATENT DOCUMENTS

| 6,055,391 | A | 4/2000 | Jackson et al. | |
|---|---|---|---|---|
| 8,579,405 | B2 | 11/2013 | Huyghen et al. | |
| 2013/0222446 | A1* | 8/2013 | Donahue | B41J 11/0095 347/8 |
| 2015/0273921 | A1* | 10/2015 | Sasaki | B41J 29/393 347/19 |

FOREIGN PATENT DOCUMENTS

| EP | 1 447 229 A1 | 8/2004 |
|---|---|---|
| JP | 2008-80639 A | 4/2008 |
| JP | 2010-42627 A | 2/2010 |
| JP | 2015-186852 A | 10/2015 |
| WO | WO 2004/096527 A2 | 11/2004 |

* cited by examiner

*Primary Examiner* — Huan Tran
*Assistant Examiner* — Alexander D Shenderov
(74) *Attorney, Agent, or Firm* — Birch, Stewart, Kolasch & Birch, LLP

(57) ABSTRACT

A system for detecting friction between an object, that is being printed in a printer, and a print head moving relative to the object, comprising: an acoustic sensor system arranged to detect an acoustic noise signal generated by the printer; a recording system arranged to record the noise signal while the print head moves relative to the object; and an electronic processing system arranged to detect, in the recorded noise signal, correlated with the reciprocating movement of the printhead over the printed object, a signature that is characteristic of an event of friction between the print head and the object.

20 Claims, 3 Drawing Sheets

PRINT HEAD FRICTION DETECTION SYSTEM

BACKGROUND OF THE INVENTION

1. Field of the invention

The invention relates to a system for detecting friction between an object, that is being printed in a printer, and a print head reciprocating relative to the object.

2. Description of the Related Art

When a print head of a scanning-type printer moves relative to an object, e.g. relative to a substrate on which the object is printed in a layerwise way, a collision between the print head and the object may cause serious damage to the object and/or the print head. In order to limit such damage, it is known to automatically detect collisions between the print head and the object and to cause an emergency stop of the printer as soon as a collision is detected.

U.S. Pat. No. 8,579,405 B2 discloses an ink jet printer which is also capable of detecting a situation in which the print head does not experience a hard collision with the print substrate but just gently touches the print medium with its nozzle face. This is achieved by counting the number of nozzles of the print head which show malfunction due to direct contact with the print medium.

U.S. Pat. No. 6,055,391 discloses a printer in which acoustic microphone based systems are used for detecting characteristic vibration signatures that are indicative of machine breakage, machine wear, and the like.

In the art of relief printing or 3D-printing, an elevated, three-dimensional object is printed by superposing several layers of curable ink. Consequently, the height of the top surface of the object on which a new layer of ink is to be deposited increases with every layer that is being added. On the other hand, in order to achieve a high print quality, the distance between the print head and the surface of the printed object should be kept as small as possible. It is therefore necessary to control the height of the print head in accordance with the gradual build-up of the printed object. Thus there exists a risk of an event where the print head comes into frictional contact with the printed object, for example due to errors or tolerances in the height control of the print head, tolerances in the height of a substrate on which the object is being printed and which is supported and fixed by means of jigs, adhesive tape or the like, or else due to a false estimate for the exact thickness of the layers of ink that are deposited in each print pass.

When an event of friction between the print head and the printed object occurs, this may not only compromise the quality of the printed object but may also cause damage to the print head.

It is therefore an object of the invention to provide a system for reliably detecting friction between the printed object and the print head.

SUMMARY OF THE INVENTION

In order to achieve this object, the system according to the invention comprises:

a) an acoustic sensor system arranged to detect an acoustic noise signal generated by the printer;
b) a recording system arranged to record the noise signal while the print head moves relative to the object; and
c) an electronic processing system arranged to detect, in the recorded noise signal, correlated with the reciprocating movement of the printhead over the printed object, a signature that is characteristic of an event of friction between the print head and the object.

The invention is based on the apprehension that, although a scanning-type printer, when operating, will produce some background noise and it should be expected that the background noise masks the faint scraping noise that is caused by friction between the print head and the object, it is possible to detect friction events on the basis of slight noise variations that are caused by the print head sliding over the surface of the printed object, in particular since these noise variations have a characteristic signature that is correlated with the reciprocating movement of the print head over the printed object.

The system according to the invention thus permits to issue a warning signal as soon as minor friction occurs between the printed object and the print head, so that the operating personnel may be alerted and may then take measures to avoid greater damage. Optionally, the system may also be used for automatically stopping the print operation, e.g. when the printer is left unattended or is left operating over night in order to print a larger, and possibly higher, object.

Useful optional features of the invention are indicated in the dependent claims.

In one embodiment, the acoustic sensor system and the print head may be mounted on a common carriage which moves across the printed object. This facilitates to discriminate noise that is generated at the print head from noise originating from a larger environment.

The characteristic signature that is used for detecting an event of friction may comprise one or more characteristic features of the frequency noise spectrum.

The characteristic signature may also comprise a characteristic timing pattern that reflects the movement of the print head relative to of the top surface of the object that is being printed.

Characteristic signatures may be stored in a database for being checked automatically against the recorded signal. For example, characteristic signatures for different types of printer, different materials of the printed objects, and the like may be stored.

The time correlation between the recorded signal and the reciprocating movement of the print head carriage may be based on sync signals that are provided by the printer control system. As an alternative, such sync signals may also be generated automatically by analyzing the acoustic noise signal. For example, the noise that is caused by the movement of the print head carriage may contain intervals of relative silence when the carriage stops and changes direction at the end of each scan pass. In this way, the timings of the scan passes can be detected directly from the noise signal.

If the print head or print head carriage has one or more curing lamps for curing the printed ink, e.g. by means of UV radiation, these curing lamps are typically provided with shutters that are opened and closed in each scan pass of the print heads. The opening and closing of the shutters is accompanied by a characteristic clicking noise which can easily be detected in the recorded noise signal and may therefore serve as sync signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

Embodiment examples will now be described in conjunction with the drawings, wherein.

DETAILED DESCRIPTION OF EMBODIMENTS

Figure 1:
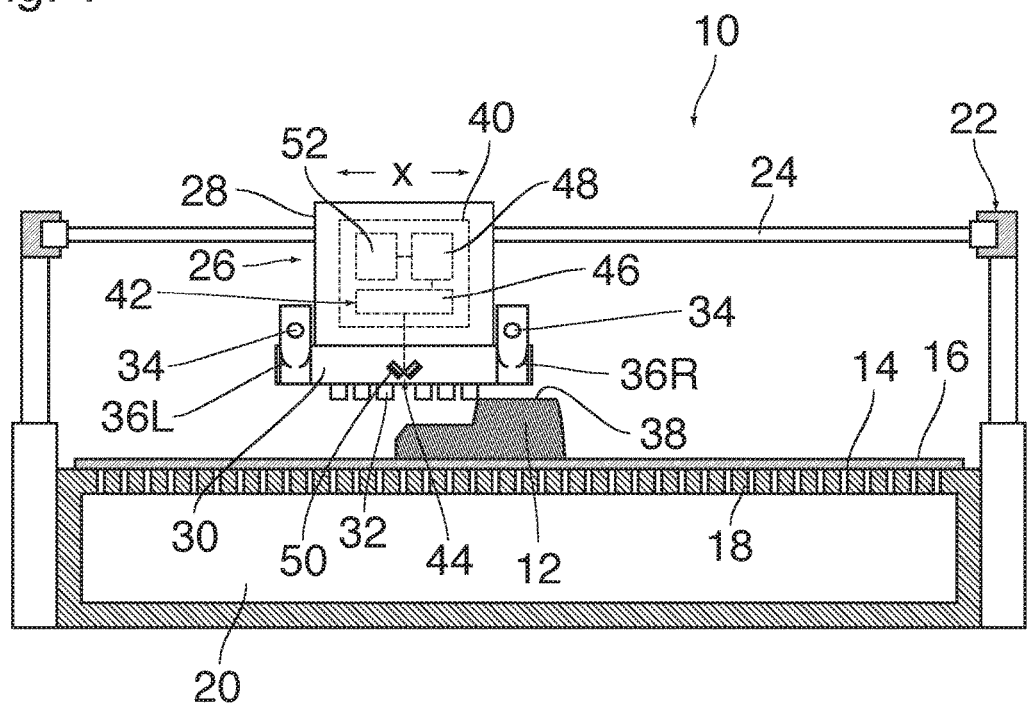
FIG. 1 is a schematic sectional view of a flat bed printer to which the invention is applicable.

The present invention will now be described with reference to the accompanying drawings, wherein the same or similar elements are identified with the same reference numeral.

FIG. 1 shows a flat bed ink jet printer 10 which is used for printing a three-dimensional object 12. The printer has a print surface 14 supporting a print substrate 16 on which the object 12 is being formed. The print surface 14 is constituted by a perforated top wall 18 of a suction chamber 20 in which a vacuum pressure is created for securely holding the print substrate 16 on the print surface.

The printer 10 has a height adjustable gantry 22 with a guide rail assembly 24 that extends over the entire width of the print surface 14 and along which a print head carriage 26 is movable in a main scanning direction x, as indicated by a double arrow in FIG. 1. In this example, the carriage 26 is composed of a drive and control section 28 that moves along the guide rail assembly 24, and a print head section 30 mounted to the bottom side of the drive and control section 28 and carrying a number of print heads 32 arranged to face the print surface 14. The print head section 30 further has two UV curing lamps 34 disposed on opposite sides of the print heads 32 for irradiating the ink that has been jetted out from the print heads 32 with UV light. Each curing lamp has a shutter 36L, 36R that is opened only when the corresponding lamp 34 moves over the region where the printed object 12 is being formed.

The gantry 22 is also movable in a sub-scanning direction which is the direction normal to the plane of the drawing in FIG. 1. When the carriage 26 has completed a scan pass in the main scanning direction x and the print heads 32 have printed a swath of ink on a top surface 38 of the object 12, the gantry 22 is moved a suitable distance in the sub-scanning direction so that another swath may be printed in the next pass of the carriage 26.

In the example shown, the drive and control section 28 of the carriage 26 accommodates an electronic controller 40 which controls the functions of the printer 10, including the operation of the print heads 32, the movements of the carriage 26 and the gantry 22, the height adjustment of the gantry 22, and the operation of a blower (not shown) which creates the vacuum in the suction chamber 20.

As shown in FIG. 1, the height of the gantry 22 is controlled such that only a very narrow gap (with a size in a range of 1 to 2 mm, e.g. 1.4 mm under normal operating conditions) is formed between the bottom faces (nozzle faces) of the print heads 32 and the top surface 38 of the highest part of the object 12 where another layer of ink is to be deposited. Consequently, even minor inaccuracies in the height control of the gantry 22 may have the consequence that the print heads 32 contact the printed object 12 and gently slide over the top surface of the object. Since such a friction event may degrade the quality of the printed object 12 and may also cause damage to the print heads 32, a detection system 42 is provided for automatically detecting such friction events.

The detection system 42 comprises an acoustic sensor system 44, a recording system 46 and an electronic processing system 48. The acoustic sensor system 44 is constituted by two microphones 50 mounted in the center of the print head section 30 of the carriage and oriented in opposite directions in the main scanning direction x.

The recording system 46 and the processing system 48 are implemented in the controller 38. The recording system 46 receives and records a noise signal received from the sensor system 44, and the processing system 48 is programmed to further process the recorded noise signal so as to detect, in the noise signal, a characteristic signature that is indicative of a friction event.

The controller 40 further includes a memory 52 which stores at least one template for a signature that is characteristic of a noise event, so that the noise event may be detected in the processing system 48 by comparing the recorded noise signal to the template.

Figure 2:
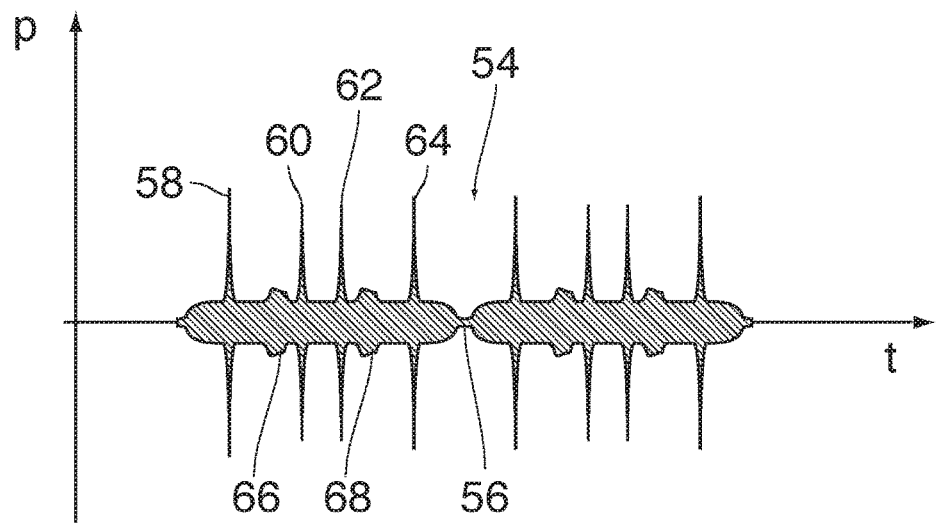
FIG. 2 is a time diagram of an acoustic noise signal.

FIG. 2 shows an example of a noise signal 54 that has been recorded by the recording system 46 during a time in which the print head carriage 26 moves over the printed object 12 from left to right in FIG. 1 and then back from right to left. More precisely, the hatched area in FIG. 2 shows the oscillations of an acoustic pressure p as a function of time t. The acoustic pressure fluctuations may be recorded for example at a standard sampling rate of 44100 Hz or 96000 Hz. The recording system 46 may further include a high pass filter or a band pass filter for filtering out low frequency components in order to suppress the background noise (at a frequency of about 200 Hz) of the compressor or blower which generates the vacuum in the suction chamber 20.

One component of the noise signal 54 is caused by the movement of the print head carriage 26 along the guide rail assembly 24 (noise of drive motors and the like). This signal component comprises two parts that are separated by an interval 56 of relative silence when the carriage stops and the gantry 22 moves in the sup-scanning direction so as to print another swath of ink on the surface 38 in the next two passes.

Further, a sharp noise peak 58 is produced by a clapping noise at the time when the right shutter 36R of the curing lamp 34 on the right side in FIG. 1 opens at the start of the first scan pass. Another peak 60 is produced when the right shutter 36R closes again. Then, when the carriage moves back from right to left in FIG. 1, two further peaks 62 and 64 are produced by the opening and closing of the shutter 36L on the left side. The same pattern of peaks will be repeated when, after the interval 54, the carriage makes the next two scan passes.

In FIG. 2, a noise signal 66 which is slightly higher than the background noise level is detected between the peaks 58 and 60. More precisely, the noise signal 66 sets in when the rightmost of the print heads 32 reaches the surface 38 of the object 12, and it falls off again when this print head leaves the surface 38, shortly before the right shutter 36R closes again. This noise signal 66 can be taken as an indication that the rightmost print head scrapes over the surface 38. The other five print heads 32 will produce less noise or low noise at all because, when they move over the surface 38, some ink has already been scraped-off by the first print head.

In the return pass of the print head, another noise signal 68 is detected, which sets in shortly after the left shutter 36L has opened (peak 62), and falls off when the leftmost of the print heads 32 has left the surface 38. Due to the shape of the printed object 12, it will still take a while until the shutter 36L reaches the leftmost end of the object 12 (where the height thereof is lower) and the peak 64 indicates the closing of the shutter.

It will thus be observed that the noise signals 66 and 68 have approximately the same length, determined by the length of the surface 38, and have a characteristic time relationship to the peaks 58-64, which permits to confirm with high reliability that the noise signals 66, 68 are due to friction between the print heads and the printed object.

Based on the known geometry of the object 12 to be printed, it would also be possible to calculate a template for the noise signals 66 and 68 and to store this template in the memory 52 for comparison with the actually received noise signal 54.

Another characteristic feature of the noise signals 66 and 68 will be the frequency or spectral composition of these noise signals.

Figure 3:
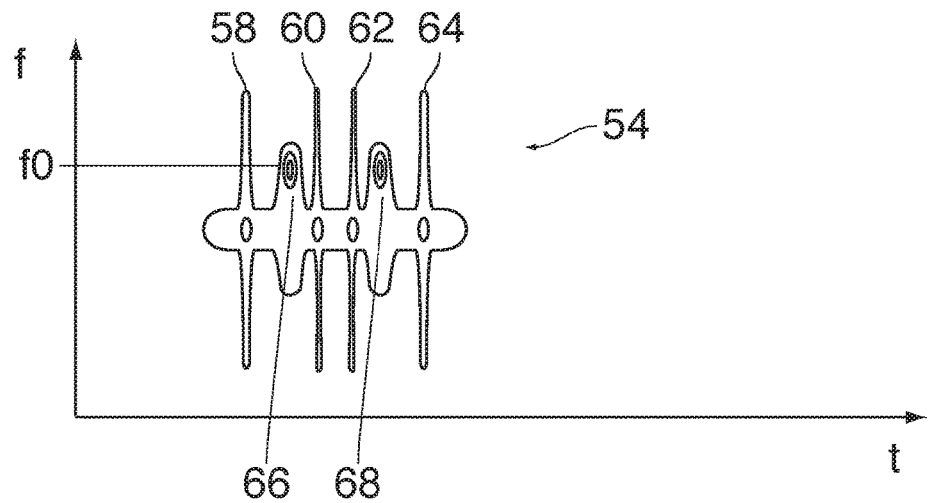
FIG. 3 is a time and frequency diagram of the noise signal.

FIG. 3 shows the same noise signal 54 as FIG. 2, but this time represented by a spectrogram that indicates the amplitude of the noise signal as a function of time t and frequency f. The amplitude is indicated in FIG. 3 by contour lines of equal amplitude. It can thus be seen that the peaks 58-64 which are caused by the shutters have a broader frequency spectrum than the background noise. Further, it can be seen that the friction-induced noise signals 66 and 68 have their highest amplitude at a certain frequency $f_0$ (e.g. in the order of magnitude of 6 kHz) which is significantly higher than the frequency maximum of the background noise. Thus, the frequency spectrum of the noise signals 66 and 68 is another strong indicia indicating that these signals originate from friction between the print head and the printed object.

It will be understood that the exact shape of the frequency spectrum of the noise signals 66 and 68 may differ from printer to printer (even for printers with the same construction) and may also depend upon other factors such as the ink composition and the curing state of the ink at the time when friction occurs, the amount of height mismatch between the nozzle faces of the print heads and the surface 38, and the like. It is therefore convenient to record spectrograms of the type shown in FIG. 3 and store them in the memory 52 each time when a friction event has been detected and confirmed, so that a data base of characteristic frequency signatures may be established in a kind of learning process. Then, when another friction event occurs, this event may be detected with high reliability because the signature thereof will match with at least one of the signatures stored in the data base.

Figure 4:
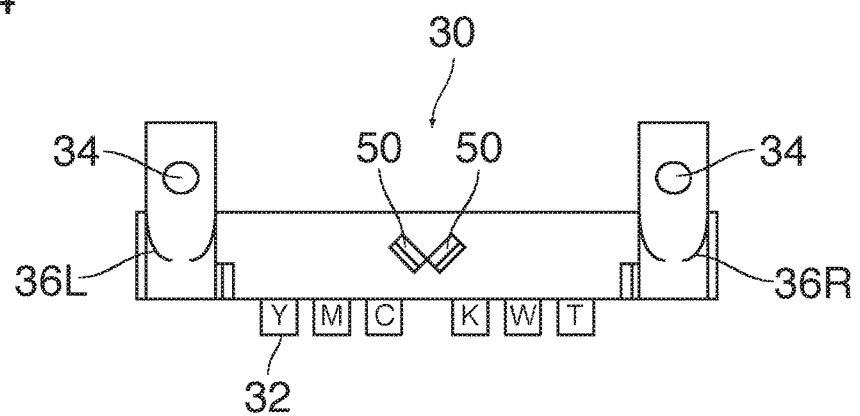
FIGS. 4 and 5 are views of print head carriages with detection systems according to different embodiments of the invention.

FIG. 4 shows the print head section 30 of the carriage 26 on a larger scale. In this example, the print heads 32 are provided for printing with UV-curable inks in the colors yellow (Y), magenta (M), cyan (C), black (K) and white (W). Another print head is provided for printing with transparent ink (T). It can be seen that the two microphones 50 are disposed at the center between the two groups of print heads 32 and are directed to opposite sides of the carriage, so that it is possible to detect and record a stereo signal. In particular, one of the microphones will be more sensitive to the opening and closing of the left shutter 36L and the other microphone will be more sensitive to the opening and closing of the right shutter 36R. This facilitates to associate the peaks 58-64 in the noise signal with the correct shutters.

Moreover, when the carriage moves from left to right, it will normally be the print head for transparent ink T that produces the greatest noise signal 66 in case of a friction event, whereas, in the backward stroke, the greatest noise signal 68 will be produced by the print head for yellow ink Y. Since the two microphones 50 have also different sensitivities for these two print heads, the analysis of the stereo signal can further enhance the reliability in the detection of friction events.

Figure 5:
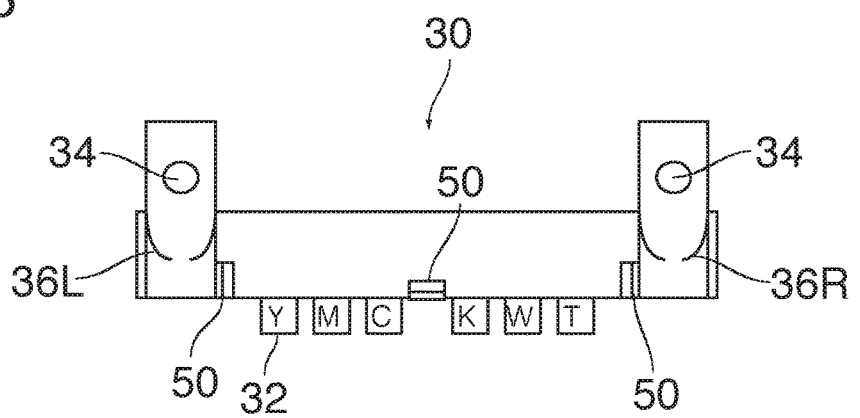

FIG. 5 illustrates a modified example where three microphones 50 have been mounted on the print head section 30 of the carriage. One microphone has been disposed at the center between the two groups of print heads 32 and is directed downwards, whereas the two other microphones 50 have been disposed directly adjacent to the shutters 36L and 36R, respectively, so as to be selectively sensitive to noise from print heads and shutters on one side of the carriage.

In the example shown in FIG. 1, the electronic parts the friction detection system 42 have been integrated in the controller 40. Of course, it is also possible to provide a separate controller for the friction detection system, which is particularly convenient when an existing printer shall be retro-fitted with the detection system. In that case, the utilization of the shutter noises as sync signals for tracking the movements of the carriage 26 facilitates it to interface the friction detection system with the printer controller 40.

Of course, it is also possible to derive the sync signals that indicate the movement of the carriage 26 directly from the controller 40.

Regardless of whether the sync signals are derived from the controller 40 or from the microphones 50, the processing of the noise signal for recognizing characteristic signatures may be limited to the time periods whether print heads are actually moving over the printed object 12, e.g. the time periods between the opening and closing the shutters in each scan pass. This also means that the processing of the noise signal does not have to be achieved strictly in real time, because the time when the noise signal is recorded is limited to only a fraction of the scan pass whereas the entire duration of the scan pass is available for processing the recorded signal.

Figure 6:
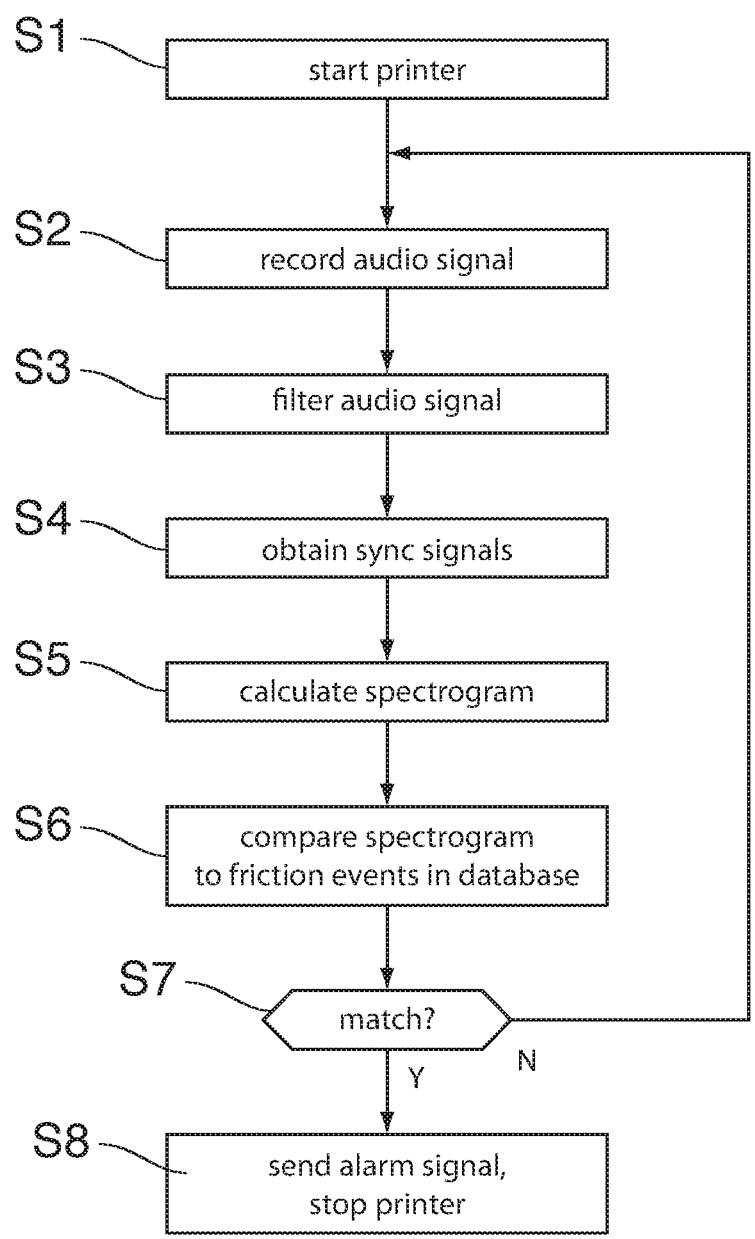
FIG. 6 is a flow diagram illustrating the operation of the system according to the invention.

FIG. 6 is a flow diagram illustrating the operation of the friction detection system 42.

The printer 10 is started in step S1. Then, in step S2, the recording system 46 starts recording the noise signal received by the microphones 50.

In step S3, the recorded signal is high-pass filtered with a suitable cut-off frequency for suppressing background noise from the blower and other sources.

In step S4, the sync signals are derived for determining the state of movement of the carriage 26. In the given example, the sync signals are obtained by analyzing the characteristic peaks 58-64 in the noise signal. If, in another embodiment, the sync signals are derived directly from the printer controller, the order of the steps S2 and S4 may also be reversed and the periods where the audio signal is recorded may be limited to the time when the print head passes over the print region.

In step S5, the spectrogram (FIG. 3) is calculated from the recorded signal, and in step S6 the processing system 48 compares the spectrogram calculated in step S5 with template spectrograms for friction events that are stored in the data base in the memory 52. In step S7, it is checked whether the spectrogram calculated in step S5 matches with at least one of the spectrograms in the data base. If this is not the case (N), the routine loops back to step S2, and recording of the audio signal is resumed for the next scan pass.

On the other hand, when a match is found in step S7 (Y), the routine branches to a step S8 where an alarm signal is output in order to alert the operator of the printer. Optionally, the printer may be stopped immediately. The decision whether to send only an alarm or to stop the printer may depend upon the time of the day (send an alarm signal during working hours and stop printer when it operates over night), and it may also depend upon an assessment of the strength of the friction event.

In yet another embodiment, the step S8 may also comprise an automatic correction of the height control of the gantry 22 so as to safely avoid friction events.

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A system for detecting contact in a printer, comprising:
   a print surface;
   a carriage having at least one print head, the carriage movable in a first direction parallel to the print surface and a second direction perpendicular to the print surface;
   an acoustic sensor system arranged to detect an acoustic noise signal generated by the carriage;
   a recording system arranged to record the noise signal while the at least one print head moves relative to the print surface; and
   an electronic processing system arranged to detect, in the recorded noise signal, correlated with reciprocating movement of the carriage, a signature that is characteristic of contact between the at least one print head and an object being printed.

2. The system according to claim 1, wherein the characteristic signature comprises a characteristic time relationship between a component of the noise signal and the movement of the at least one print head relative to the object.

3. The system according to claim 1, wherein the characteristic signature comprises a characteristic frequency spectrum of the noise signal.

4. The system according to claim 2, wherein the characteristic signature comprises a characteristic frequency spectrum of the component of the noise signal for which the characteristic time relationship has been established.

5. The system according to claim 1, wherein the acoustic sensor system comprises at least one microphone mounted on the carriage that carries the at least one print head.

6. The system according to claim 5, wherein the acoustic sensor system is a stereo system comprising at least two microphones.

7. The system according to claim 1, wherein the processing system is further configured to detect a characteristic feature in the noise signal which is indicative of the movement of the at least one print head relative to the object.

8. The system according to claim 7, further comprising a curing lamp and a mechanical shutter for the curing lamp, wherein the characteristic feature indicative of the movement of the at least one print head is an opening and/or shutting noise of the shutter.

9. A system for printing a three dimensional object, comprising:
   a print surface;
   a carriage having at least one print head;
   at least one microphone for detecting an acoustic signal caused by contact between the at least one print head and an object being printed,
   wherein the at least one microphone is mounted on a bottom surface of the carriage and oriented in a downward direction.

10. The system according to claim 9, wherein the at least one microphone is two microphones.

11. The system according to claim 9, further comprising a processor receiving a signal from the at least one microphone and comparing the received signal to a reference signal to determine whether the at least one print head contacts the object being printed.

12. The system according to claim 11, wherein the processor determines whether the at least one print head contacts the object being printed by the frequency of the signal received from the at least one microphone.

13. The system according to claim 9, further comprising a UV lamp on the carriage for curing ink.

14. The system according to claim 9, further comprising a gantry for supporting the carriage above the print surface.

15. The system according to claim 14, wherein the gantry is adjustable in height.

16. A system for printing a three dimensional object, comprising:
   a print surface;
   a carriage having at least one print head;
   at least one microphone for detecting an acoustic signal caused by contact between the at least one print head and an object being printed;
   a processor receiving a signal from the at least one microphone to determine whether the at least one print head contacts the object being printed,
   wherein the processor determines whether the at least one print head contacts the object being printed by the frequency of the signal received from the at least one microphone.

17. The system according to claim 16, wherein the processor compares the received signal to a reference signal to determine whether the at least one print head contacts the object being printed.

18. The system according to claim 16, wherein the frequency of the signal determining contact occurs at a predetermined time during movement of the carriage.

19. The system according to claim 18, wherein the received signal indicates when the carriage changes direction.

20. The system according to claim 19, wherein the processor uses the indication that the carriage changes direction to determine whether a frequency received by the microphone indicates contact of the at least one print head with the object.

* * * * *

UNITED STATES PATENT AND TRADEMARK OFFICE
CERTIFICATE OF CORRECTION

PATENT NO. : 9,931,835 B2  
APPLICATION NO. : 15/443833  
DATED : April 3, 2018  
INVENTOR(S) : Cédric T. Valade et al.

Page 1 of 1

It is certified that error appears in the above-identified patent and that said Letters Patent is hereby corrected as shown below:

On the Title Page

(73) Assignee, please change the name of the Assignee from:
"OCÉ HOLDINGS B.V., Venlo (NL)"
To:
-- OCÉ HOLDING B.V., Venlo (NL) --

Signed and Sealed this
Fifth Day of June, 2018

Andrei Iancu
*Director of the United States Patent and Trademark Office*